US007904508B2

(12) United States Patent
Bernabeu-Auban et al.

(10) Patent No.: US 7,904,508 B2
(45) Date of Patent: Mar. 8, 2011

(54) PROVIDING FUNCTIONALITY TO CLIENT SERVICES BY IMPLEMENTING AND BINDING CONTRACTS

(75) Inventors: Jose Bernabeu-Auban, Sammamish, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 12/258,149

(22) Filed: Oct. 24, 2008

(65) Prior Publication Data
US 2010/0106768 A1    Apr. 29, 2010

(51) Int. Cl.
*G06F 15/16* (2006.01)
*G06F 15/177* (2006.01)
(52) U.S. Cl. .......................................... 709/203; 709/220
(58) Field of Classification Search .......... 709/201–204, 709/216–232
See application file for complete search history.

(56) References Cited

U.S. PATENT DOCUMENTS

| | | | |
|---|---|---|---|
| 6,148,290 A | 11/2000 | Dan | |
| 7,313,812 B2 | 12/2007 | Robinson | |
| 7,502,929 B1 * | 3/2009 | Schnizlein et al. | 713/168 |
| 2003/0061404 A1 * | 3/2003 | Atwal et al. | 709/328 |
| 2004/0210670 A1 * | 10/2004 | Anerousis et al. | 709/238 |
| 2006/0218102 A1 | 9/2006 | Gibson | |
| 2007/0030843 A1 * | 2/2007 | Miller et al. | 370/352 |
| 2007/0233690 A1 | 10/2007 | Bruchlos | |
| 2008/0117808 A1 | 5/2008 | Sandstrom | |
| 2008/0141333 A1 | 6/2008 | Chen | |
| 2009/0138619 A1 * | 5/2009 | Schnizlein et al. | 709/245 |

OTHER PUBLICATIONS

Odorico Von Susani, et al. "Cross-Organizational Service Maintenance Using Temporal Availability Specification and Contracts", p. 1-10. Department of Information Technology, University of Geneva, Switzerland. http://ieeexplore.ieee.org/iel5/10097/32336/01510119.pdf?arnumber=110119.
"Hosting WCF Services (cont'd)", Aug. 26, 2008. http://www.devx.com/codemag/Article/33655/1763/page/2.
"Binding to a Specific Implementation of a Web Service at Runtime", Aug. 26, 2008. http://searchsoa.techtarget.com/expert/KnowledgebaseAnswer/0,289625,sid26_gci1017134,00.html.
Humberto Cervantes, et al. "Automating Service Dependency Management in a Service-Oriented Component Model", p. 1-6. France. http://www.osgi.org/wiki/uploads/Links/autoservdependencymgmt_byhall_cervantes.pdf.
Multiple Service Contracts and Indigo, Aug. 26, 2008. p. 1-3. http://www.aspfree.com/c/a/BrainDump/Multiple-Service-Contracts-and-Indigo/.
Intellevate Prior Art Search Report, Aug. 25, 2008.

* cited by examiner

*Primary Examiner* — Yasin Barqadle
(74) *Attorney, Agent, or Firm* — Shook Hardy Bacon LLP

(57) ABSTRACT

Methods, systems, and computer-readable media for automating the expression of functional aspects of a target service to a client service via a vehicle referred to herein as a contract are provided. Generally, the methods are performed in the context of a distributed computing environment configured to underlie operations of service application(s). In embodiments, the contract is implemented and bound upon ascertaining that the expressed functional aspects satisfy dependencies of the client service. Generally, the contract defines interfaces and maintains properties that configure the interfaces during installation. During the implementation, one of the interfaces is established and parameterized in accordance with the properties associated therewith. During the binding, the target service and the client service are linked via communication channels that are routed through the established interface. Accordingly, calls from the client service over the communication channels allow for reaching and employing the functional aspects of the target service.

18 Claims, 6 Drawing Sheets

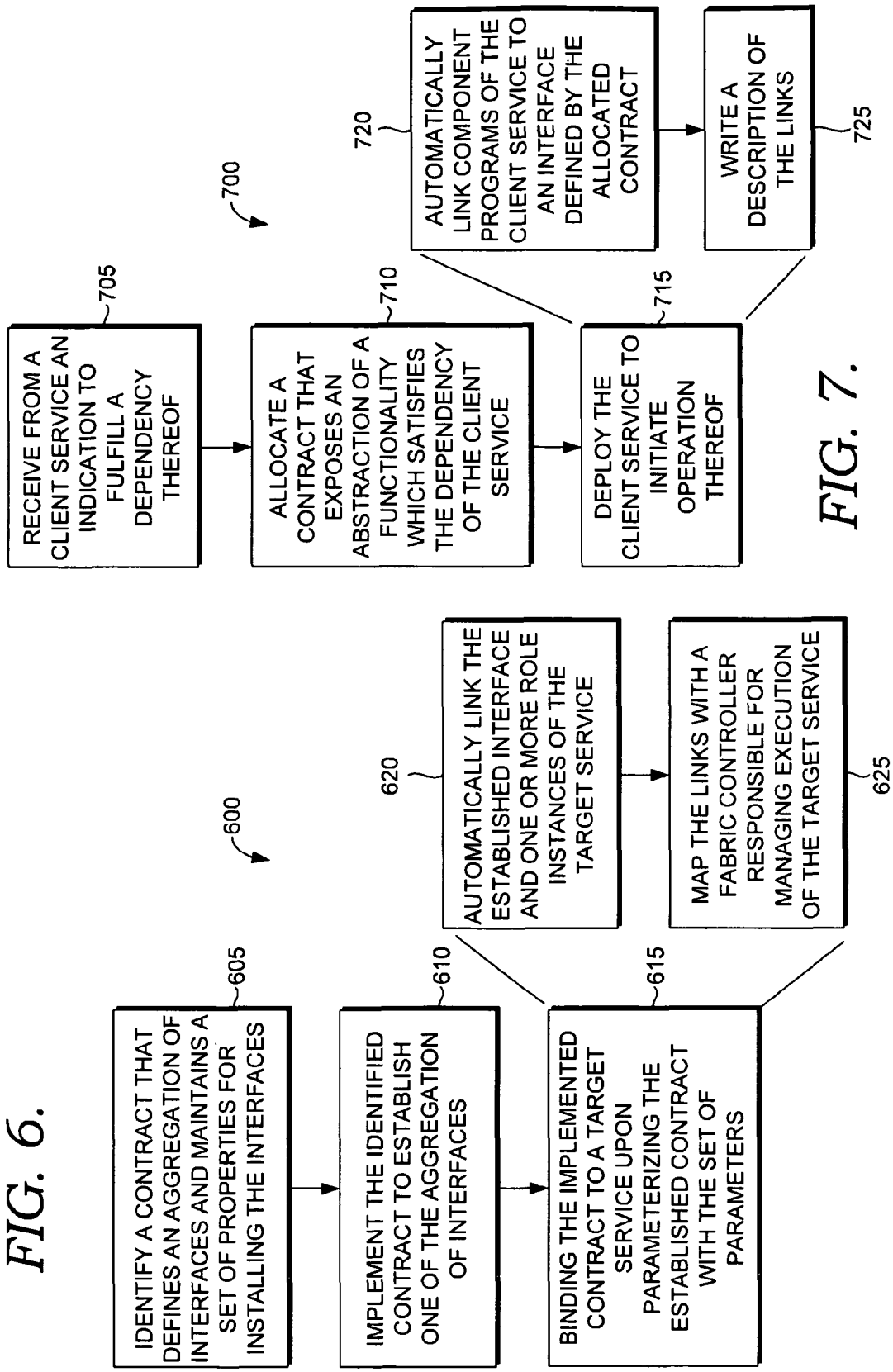

PROVIDING FUNCTIONALITY TO CLIENT SERVICES BY IMPLEMENTING AND BINDING CONTRACTS

BACKGROUND

Typically, developers write software applications to allow for many degrees of freedom in their configuration. By way of example, these developers are able to leverage these degrees of freedom by establishing a software application that operates within specific constraints of a particular platform that is provided to support the software application. Thus, these freedoms associated with the software application enable the software application to operate in cooperation with the platform.

In one instance, this configuration of software application may be employed by application-service providers who develop the software application to operate on a platform that is remotely accessible via the Internet. In this instance, the platform executes the software program in such a way that users may remotely manipulate files using the software application. Accordingly, the platform is adapted to establish underlying elements of the software application running thereon to accommodate a current load of the remote usage. The degrees of freedom in the software application allow for scaling up or down these underlying elements and for managing the coordination therebetween. However, because there exists no way to publicize the functionality of these underlying elements, providing the ability to utilize this functionality to software programs beyond the subject software application is impractical. Further, even if the other software programs were aware of the functionality of currently running underlying elements, there exists no means for automatically linking the software applications together or automatically configuring the underlying elements to allow for remotely harnessing the functionality.

Current solutions to configure the underlying elements of the software application rely on curators of the platform to manually set up the underlying elements. These ad hoc solutions are labor-intensive, error-prone, and do not encompass linking underlying elements to another software program. Further, these shortcomings of manual involvement are exaggerated when the platform is expansive in size, comprising a multitude of interconnected hardware components, that support the operation of a multitude of software applications.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to methods, systems, and computer-storage media having computer-executable instructions embodied thereon that, when executed, perform methods in accordance with embodiments hereof, for automating the expression of functional aspects of a target service (e.g., a service application running in a distributed computing environment) to a client service via a vehicle referred to herein as a contract. Generally, the methods are performed in the context of a distributed computing environment configured to underlie operations of service application(s). In embodiments, the contract is allocated upon ascertaining that the functional aspects expressed thereby satisfy dependencies of the client service. Upon allocation, methods of the present invention may include implementing the contract within the distributed computing environment and binding the implemented contract to component programs of the service applications.

Generally, the contract defines interfaces and maintains properties that configure the interfaces during installation. During the implementation of the contract, one of the interfaces is established and parameterized in accordance with the properties associated therewith. During the binding of the implemented contract, input endpoints of the component programs making up the target service are linked via communication channels to the established interface. Accordingly, accessing the functional aspects of the target service is provided to other service applications that can reach the established interface.

The process of binding may also include the procedures of linking output endpoints of the component programs that comprise the client service to the established interface, and configuring the target service based on the parameterization of the established interface. In addition, the client service may be configured to format calls issued from the output endpoints to certain characteristics of the target service. Accordingly, the calls from the client service may be routed over the communication channels to allow for reaching the target program and may be compatible with the configuration of the target service to allow for properly employing the functional aspects of the target service.

In embodiments, the target service may ascertain the identity of the client service upon receiving the call as well as a claim appended thereto. The target service is generally capable of dynamically reacting to the identity of the client service. As such, upon understanding the identity of the client service, the target service may consequently adapt its level of service (e.g., manipulate its functional aspects) to accommodate the particular client service when replying to the call.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein:

FIG. 6 is a flow diagram showing an overall method for automatically implementing a contract and binding the implemented contract to the target service, in accordance with an embodiment of the present invention; and FIG. 7 is a flow diagram showing an overall method for automatically allocating the implemented contract based on dependencies of the client service and binding the allocated contract thereto, in accordance with an embodiment of the present invention.

DETAILED DESCRIPTION

Figure 1:
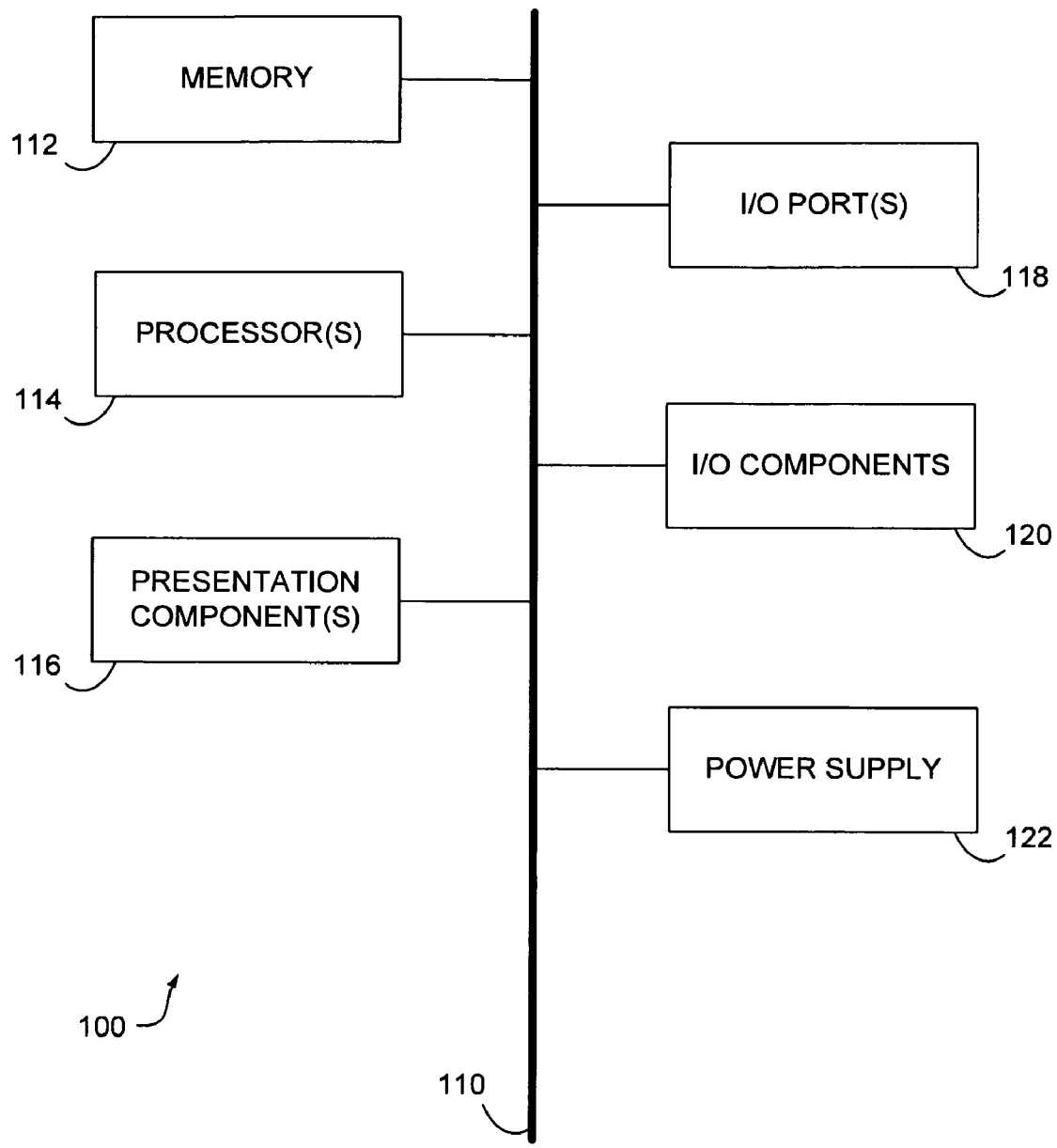
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to methods, systems, and computer-storage media having computer-executable instructions embodied thereon that, when executed, perform methods in accordance with embodiments hereof, for automatically accommodating client services that are written expecting certain functionalities to be available to support operation of the client services. These functionalities relied upon by the client service may be exposed by contracts, that serve as a vehicle for allowing the client service to reach and employ the functionalities at a target service running within a distributed computing environment. The appropriate contract may be allocated based on whether the contract exposes functionalities that satisfy dependencies that the client service expects to be fulfilled. Then the allocation contract may be implemented (e.g., establishing an interface within the distributed computing environment) and bound to the target and client services (e.g., linking component programs of the target and client services via the established interface). As such, the expected functionality required to enable execution of the client service is automatically discovered and linked to the client service.

Accordingly, in one aspect, embodiments of the present invention relate to one or more computer-readable media that have computer-executable instructions embodied thereon. Upon executing the computer-executable instructions, a method for binding an implemented contract to a target service within a distributed computing environment is provided. Initially, the method includes identifying a contract that defines an aggregation of interfaces and implementing the identified contract to establish an interface of the aggregation of interfaces within the distributed computing environment. Typically, the contract maintains a set of properties for installing each of the interfaces and the implemented contract acts as a vehicle for a client service to reach a portion of the target service. In addition, the method may include binding the implemented contract to the target service by parameterizing the established interface with values derived from the set of properties associated with the established interface. In embodiments, the process of binding includes automatically linking the established interface and one or more role instances, and mapping the links via a fabric controller responsible for managing the execution of the target service. Generally, the role instances embody replications of at least one role that represents a type of component program that, upon execution, confers functionality to the target service.

In another aspect, embodiments of the present invention relate to a computerized method for binding an implemented contract that is previously bound to a target service to a client service within a distributed computing environment. In embodiments, the method comprises receiving from the client service an indication to fulfill a dependency thereof and allocating a contract that exposes an abstraction of a functionality which satisfies the dependency of component programs of the client service. Typically, the contract is previously implemented within the distributed computing environment and is bound to a target service that carries out the functionality. The method may further include deploying the client service to initiate operation thereof. In an exemplary embodiment, deploying involves automatically linking the one or more component programs to an interface defined by the allocated bound contract, wherein the interface is established within the distributed computing environment upon implementation of the allocated bound contract, and writing a description of the links to a fabric controller responsible for managing the execution of the target service. In embodiments, the method initially includes, but is not limited to, receiving an indication to increase the number of instances of a role of service application. As mentioned above, the role represents a particular class of component that operates in conjunction with other roles of the service application to realize distributed functionality thereof. By way of example, the indication arises from an event comprising at least one of a change in a remote-usage workload of the service application or one or more nodes of the data center falling offline. Accordingly, these events, and other events contemplated by the invention, may drive the desirability of installing additional roles of the service application within the distributed data center.

In yet another aspect, embodiments of the present invention relate to a computer system capable of automatically linking a client service to a target service by way of implementing and binding a contract made available by a distributed computing environment. Generally, the data center includes distributed computing devices. The computer system may include a computer storage medium that has a plurality of computer software components embodied thereon. Initially, the computer software components include service applications (e.g., a client service and a target service), a contract, and a fabric controller that is configured to manage the distributed computing environment. Generally, the client service includes one or more component programs, while the target service includes one or more role instances, where the role instances embody replications of at least one role that represents a type of component program that, upon execution, confers functionality to the target service. In operation, the client service is configured to submit an indication to fulfill a dependency thereof. The contract may expose an abstraction of the functionality of the target service, which satisfies the dependency of the component programs of the client service. The contract is further configured for defining at least one interface. The fabric controller is configured for performing one or more of the following processes, in no particular order: establishing the interface on the distributed computing platform by implementing the contract; binding the contract to the target service and to the client service; and automatically linking the program components of the client service to the role instances of the target service via the established interface.

Figure 2:
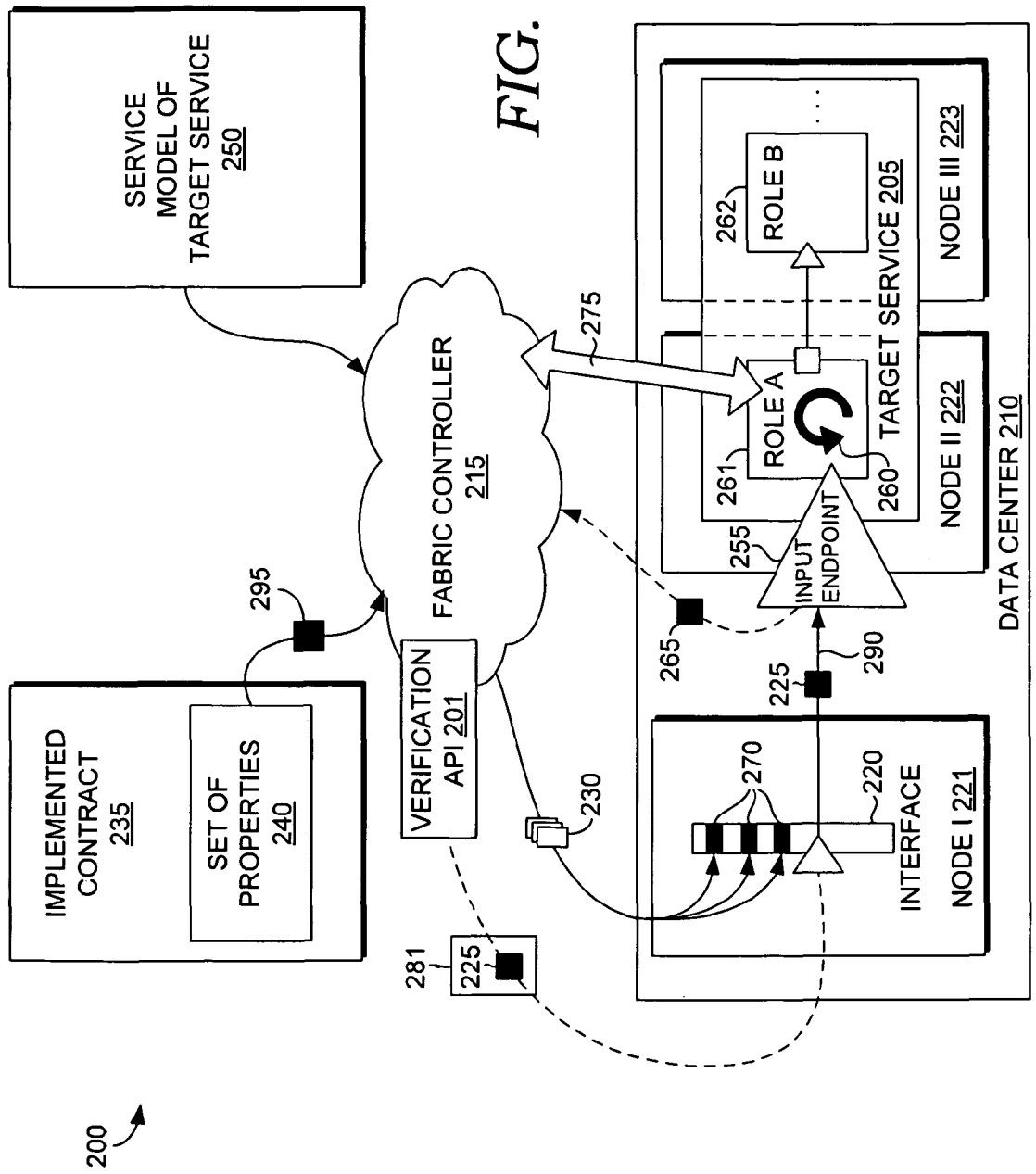
FIG. 2 is a block diagram illustrating an exemplary distributed computing environment, suitable for use in implementing embodiments of the present invention, that is configured to bind an implemented contract to a target service.

Generally, the instantiation and coordinated management of the role instances of the target service is facilitated by a service model (see reference numeral 250 of FIG. 2). As utilized herein, the phrase "service model" is not meant to be limiting and generally refers to any communication that includes information pertaining to establishing and managing instances of a target service within the distributed computing environment. In one instance, the service model includes a description of which roles of the target service are to be established, or how the instances of each of the roles are to be installed and activated within the data center. That is, the service model serves as an articulation of which roles should be running for the target service and conditions for where instances of the roles should be installed.

In addition, the service model may allocate one or more node (e.g., nodes I 221, II, 222, III, 223, IV, 224, and V 225 of FIGS. 2 and 3) within the distributed computing center (see reference numeral 200 of FIGS. 2 and 3) for supporting the instances of the roles. This may be performed by the fabric controller. Accordingly, the service model acts as an interface blueprint that provides instructions for managing component programs, such as the role instances, of the target service as well as the client service, in particular embodiments. That is, the service model helps guide the fabric controller in coordinating activities between the component programs upon being deployed to distributed locations throughout the distributed computing environment. These locations are typically described by a deployment specification within the service model. In general, the phrase "deployment specification" is meant to be limiting and is utilized to refer to a mechanism that manages the instantiation of the role instances on the nodes, that identifies which communication channels to utilize as communication paths between the role instances, and/or that provides information describing a particular way the target service will be executed.

The role instances of the target service (e.g., role A 261 and role B 262 of the target service 205 of FIG. 2) generally refer to replicas of at least one role. In general, as utilized herein, the term "role" broadly represents any class of components that operate in conjunction with other roles of the target service to realize the functionality that satisfies an expected dependency of the client service.

In order to initiate operation of the target service, and the functional aspects thereof, the service model in conjunction with the deployment specification instantiates the role instances onto nodes of the distributed computing environment. Instantiation initially includes allocating nodes that are ascertained to be available for hosting a role instance, placing the role instance on the allocated nodes, configuring the placed role instances, and constructing interconnections between input endpoints and output endpoints disposed on the role instances. As discussed more fully below, upon implementing a contract, an interface may be linked to the input endpoints of the role instances to promote access to a portion of the functionality of the target service.

Generally, nodes within the distributed computing environment are utilized to accommodate the operation of the role instances. As used herein, the term "node" is not meant to be limiting, but to encompass all forms of computing devices, such as, for example, a personal computer, a desktop computer, a laptop computer, a handheld device, a mobile handset, consumer electronic device, and the like. In one aspect, the node represents a computing device of a plurality of distributed computing devices interconnected via a network cloud. Generally, these distributed computing devices are capable of hosting a plurality of instances of various roles of the service application. By way of example, a particular node may be capable of accommodating two or more hosting environments that each support role instance(s). These role instances may run on the node in complete isolation (i.e., imposing a high level of security on the service application), in partial communication with other roles, or in an interactive state with one or more other roles of the service application.

Once operational, the running target service may be bound to a client service to fulfill an expected dependency written to the client service. Contracts are typically the vehicles employed by the present invention to advance the process of binding. In one embodiment, the contracts expose an abstract definition of what is expected of a running target service (i.e., the functionality of the target service). In another embodiment, the contracts define an aggregation of interfaces and maintain a set of properties associated with each of the interfaces. Generally, the interfaces are related in one or more aspects. In embodiments, the properties are utilized to tailor, or parameterize, an interface upon installation to the distributed computing environment. By way of example, the properties may be dependent, in part, on a protocol of the nodes. Those properties are filled when creating the target service with appropriate information so that the fabric controller can find the target service and can configure the component programs of the client service to successfully reach to the target service.

As discussed below, the contract may be implemented (e.g., establishing one of the aggregation of defined interfaces) and bound to the target service. The fabric controller may elect to bind the target service to one or more target services based, in part, on the functionality of the target service(s). Accordingly, the contract may be bound to more than one service application. However, the interface that is established during implementation of the contract may be configured differently in accordance with characteristics of the node, role instances of the elected target service, and the like.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-usable instructions, including computer-executable instructions such as component programs, being executed by a computer or other machine, such as a personal data assistant or other handheld device. Generally, component programs including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Turning now to FIG. 2, a block diagram is illustrated showing a distributed computing environment 200, suitable for use in implementing embodiments of the present invention. Generally, the distributed computing environment 200 is configured to bind an implemented contract 235 to a target service 205 and to bind a contract bound to the target service 205 to a client service, as demonstrated in FIG. 3. The distributed computing environment 200 includes a data center 210 configured to accommodate and support operation of component programs, or instances of roles A 261 and B 262, of the target service 205 according to the service model 250. It will be understood and appreciated by those of ordinary skill in the art that the data center 210 shown in FIG. 2 is merely an example of one suitable for accommodating one or more service applications (e.g., the target service 205) and is not intended to suggest any limitation as to the scope of use or functionality of embodiments of the present invention. Neither should the data center 210 be interpreted as having any dependency or requirement related to any single node, combination of nodes (e.g., nodes I 221, II 222, and III 223), resources (not shown), or set of APIs to access the resources (not shown). Further, although the various blocks of FIG. 2 are shown with lines for the sake of clarity, in reality, delineating various components is not so clear, and metaphorically, the lines would more accurately be grey and fuzzy.

The data center 210 includes various nodes (e.g., nodes I 221, II 222, and III 223), an operating system running on each of the nodes, the role instances A 261 and B 262, interfaces (e.g., interface 220), and often a fabric controller 215 that may include fabric agents (not shown) locally installed on the nodes I 221, II 222, and III 223. The fabric agents act as extensions of the fabric controller 215 and function in cooperation to install and manage the target service 205, among other things. In addition, the role instances A 261 and B 262 may be interconnected to each other via input endpoints (e.g., input endpoint 255), from which calls are issued, and output endpoints, at which the calls are received. In one instance, one or more of these interconnections may be established via a network cloud (not shown). The network cloud interconnects the entities listed above such that the role instances A 261 and B 262 and the interface 220, which may be distributably placed across various physical resources, may recognize a location of each other in order to establish communication therebetween. In addition, the network cloud facilitates this communication over communication channels 290 operably coupling the interface 220 to the input endpoint 255 of the instance 261 of role A. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

Further, it should be noted that embodiments of the present invention are not limited to implementation on such physical resources illustrated in FIG. 2, but may be implemented on any of a variety of different types of computing devices, equipment, and component programs within the scope of embodiments hereof. In other words, illustrated nodes I 221, II 222, and III 223 of the data center 210 depict an exemplary configuration only that is intended for discussion purposes only; accordingly, any suitable layout of nodes, and role instances residing thereon, known in the computing industry may be used and is contemplated by the present invention.

These exemplary nodes I 221, II 222, and III 223 and role instances A 261 and B 262 of the data center 210 serve to introduce the concept of implementing a service contract and binding the implemented contract 235 to the target service 205, which will now be discussed. Initially, a service contract is identifying. In one instance, the contract is identified for exposing an abstraction of the functionality 260 of an instance 261 of a role A that fulfills an expected dependency written to a client service (see reference numeral 305 of FIG. 3). The identified contract typically defines an aggregation of interfaces and maintains a set of properties 240 that are each associated with one or more of the interfaces. In operation, the set of properties 240 are helpful for installing and tailoring a configuration of each of the interfaces.

The identified service contract may be implemented to establish the interface 220 of the aggregation of interfaces within a computing device (e.g., node I 221) of the distributed computing environment 200. As discussed more fully above, the implemented contract acts as a vehicle for a client service to reach the functionality 260 of the target service 205. The process of implementing may include parameterizing the established interface 220 with values 230 derived from the set of properties 240 associated with the established interface 220. In one instance, parameterizing may include administering the values 230 to parameters 270 that are implicit within the interface 200.

The process of implementing may also include installing constraints 295 to the interface 220. Initially, the set of properties 240 associated with the interface 220 may specify the constraints 295 that partially govern operation of the established interface 220. Further, parameterizing the established interface 220 with the values 230 derived from the set of properties 240 enforces the constraints 295 within the distributed computing environment 200. As such, the constraints 295 serve as guidelines for determining how the interface 220 is hooked up (e.g., defining which external ports of a server may receive a call 225 from a remote web-server application) and, in part, how the interface 220 is configured. By way of example, when the properties 240 specify particular constraints 295, such as specific port numbers, the fabric controller 215 allocates them within the data center 210, and sets them up to be targeted when the call 225 is issued. Accordingly, the interface 220 is restricted to using these allocated port numbers when attempting to reach the functionality 260 of the target service 210.

The constraints 295 may assist in configuring the interface 220. In one example, the constraints 295 may induce the interface 220 to filter those attempting to access the functionality 260, thereby restricting a flow of traffic into the target service 205. In another example, the constraints 295 may induce the interface 220 to allow client services that are authenticated by a particular identity authority to reach the functionality 260. In yet another example, the constraints 295 may induce the interface 220, or the target service 205 via the interface 220, to close connections to the functionality 260 after a predefined time frame expires, thereby preventing stolen processing.

Upon implementation, the implemented contract 235 may be bound to a target service 205 via the fabric controller 215. The process of binding the implemented contract 235 to the target service 205 may include automatically linking the established interface 220 and the instances 261 of the role A via communication channels 290. As discussed more fully below with reference to FIGS. 4 and 5, the communication channel 290 may take on any one of a variety of forms. Typically, the communication channels 290 operably couple the interface 220 to the functionality 260 of the target service 205 via the input endpoint 255. The input endpoints 255 and/or the communication channels 290 may be mapped for future reference. By way of example, the fabric controller 215 may be responsible for allocating appropriate communication channels 290 in the data store 210 for use by the interface 220.

In embodiments, the interface 220, upon binding the implemented contract 235 to the target service 205, is linked to the input endpoints 255 of the instances 261 of the role A. Linking promotes access to multiple locations of the target service 205 that provides the functionality 260. In other words, the interface 220 generates an awareness of all related instances 261 of the role A that provides the desirable functionality 260.

The process of binding further comprises automatically configuring the instances 261 of the role A based on the specified constraints 295 that are enforced by the established interface 220. The process of configuring is illustrated by reference numeral 275. In embodiments, the constraints 295 embodied at the interface 220 instruct the fabric controller 215 on how to set up restrictions within the target service 205. In one example, the constraints 295 may instruct that there be a restriction on who can access the instances 261 of the role A, such as only client services located in North America. In another example, the constraints 295 that configure the interface 220 to be a security-enabled interface may in turn configure the target service 205 to review incoming calls 225 for certificate(s) of authenticity. Typically, the service model 250 is provided with, or may refer to, the constraints 295 in order to properly configure input endpoints 255 on new role instances when scaling up the number of instances of the target service 205 within the data center 210.

The process of binding still further includes identifying and linking to appropriate input endpoints 255 of the instances 261 of role A that accommodate the functionality 260. Generally, "input endpoints" refer broadly to a port that the role A expects the call 225 to enter, thereby allowing other entities to contact the role A. In addition, the port may be used to respond to a request embedded within the call 225. This response, or "reply," may be sent back to the client service providing the request for functionality 260 over the same communication channel 295. Because the target service 205 and the client service are configured to be compatible during negotiations (e.g., applying the constraints 295 from the implemented contract 235), the call 225 and reply are understandable (e.g., similar protocol or language) by both the target service 205 and the client service.

Further, upon linking to the input endpoints 255, a network address 265 (e.g., IP address) of the input endpoints 255 within the data center 210 may be propagated to the fabric controller 215 for locating the instances 261 of role A that are linked to the interface 220. These network addresses 265 represent a location of the functionality 260 exposed by the implemented contract 235 and enable client services dependent on the functionality 260 to access the appropriate locations, or role instances 261. In addition, the network addresses 265 help entities outside the data center 210 with contacting the interface 220. In general, the fabric controller 215 is responsible for acquiring and maintaining a manifest of the network addresses 265 of the input endpoints 255 upon linking the interface 220 thereto during binding.

In one instance, this network address 265 may be hidden from the client service. Accordingly, the fabric controller 215 automatically establishes a static pathway that routes the calls 225 from the service application to the appropriate input endpoint 255. In another instance, this network address 265 may be visible to the client service. In this instance, the client service may be a legacy application that requires knowledge of a contact address in order to send the call 225. Accordingly, the fabric controller 215 may publish the network address 265 to the client service. In yet another instance, this network address 265 may be accessible to the client service. Accordingly, the client service may retrieve the network address 265 to access the input endpoint upon the communication channel 290 being dynamically updated.

Upon receiving the call 255 at the target service 205, the identity of the client service providing the call 225 may be requested to verify the authenticity of the call 225. In one instance, the identity of the client service is recorded by the fabric controller 215. Recordation may occur upon deploying the client service, upon binding the client service to the implemented contract 235, or any time thereafter. Upon relaying the issued call 225 to the instances 261 of role A, a claim 281 may be appended to the issued call 225. The claim 281 may be generated by accessing the identity of the client service, to verify that the component programs of the client service issued the call 225, and integrating the determined identity, and other characteristics of the client service, into the claim 281.

In this way, the fabric controller 215 essentially vouches for the origin of the call 225 and provides authentication on behalf of the client service. As such, the claim 281 allows the target service 205 to verify the caller, thereby ensuring a particular level of security at the target service 205. In embodiments, verifying may include inspecting the claim 281 to ascertain whether to honor requests of the call 225. Inspecting may include checking for the content of the claim 281 (e.g., properties and/or capabilities of the client service). The level of detail of the content is generally dependent on the granularity of the claim 281, the type of client service sending the call 225, and/or the protocol supported by the output endpoint of the client service.

In one embodiment, properties of the client service within the claim 281 may include any information the fabric controller 215 can extrapolate about the client device. In one instance, the geo-location of the client service may be provided in the content of the claim 281. In response, the target service 205 may honor or redirect the call 225 to a more proximate node. Or, the target service 205 may modulate the reply to the call 225 based on the geo-location. For instance, if the geo-location indicates the call 225 originated from France, the target service 205 may prepare the reply in French. In another instance, a listing of rights to the functionality 260 may be incorporated in the content of the claim 281. In response, the target service 205 may restrict access of the client service to the resources it controls in accordance with the rights owned by the client service.

In another embodiment, the target service 205 may verify the identity and rights of the client service by querying a verification application programming interface (API) 201. The verification API 201 may provide data about the call 225 that was received, because the fabric controller 215 knows the source of the call 225. Accordingly, the target service 205 may proactively determine whether to fulfill the call 225 (e.g., provide the functionality 260) if the claim 281 is incomplete or unavailable.

Figure 3:
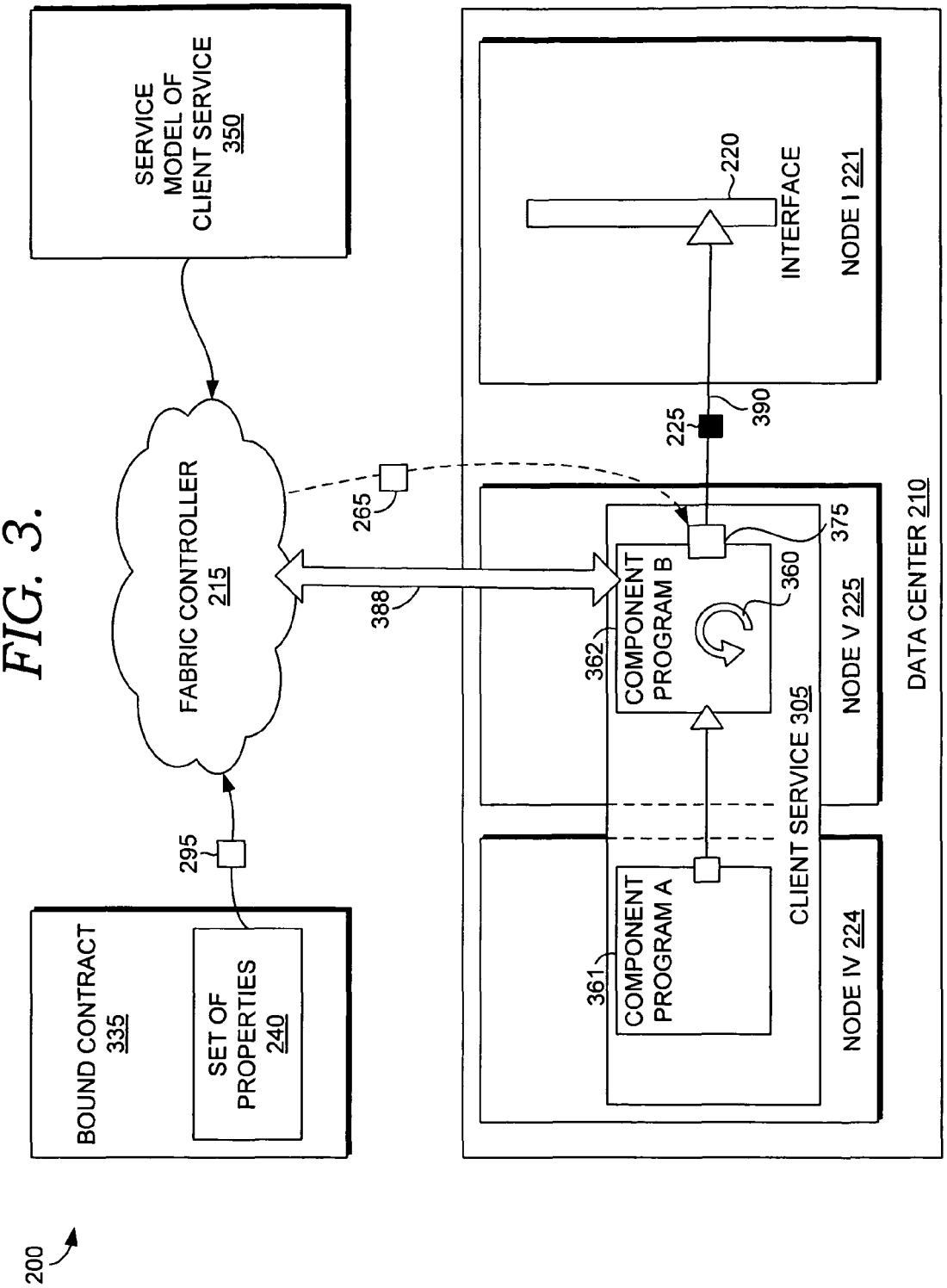
FIG. 3 is a block diagram illustrating an exemplary distributed computing environment, suitable for use in implementing embodiments of the present invention, that is configured to bind a contract bound to the target service to a client service.

Turning now to FIG. 3, a block diagram illustrating an exemplary distributed computing environment 200, suitable for use in implementing embodiments of the present invention, that is configured to bind a contract bound to the target service to a client service is shown. Initially, the distributed computing environment 200 includes a client service 305, as discussed above, for accessing the target service. The client service 305 may represent any service application that is configured to run within the data center 210, run outside the data center 210 with a remote connection thereto, or reside partially on the data center 210. The client service 305 may include component programs (e.g., component programs A 361 and B 362) that may be distributed on separate nodes (e.g., nodes IV 224 and V 225) of the data center 210. In embodiments, where the client service 305 is accommodated by the data center 210, the fabric controller 215 may be responsible for deploying the component programs A 361 and B 362, in light of a deployment specification maintained at the service model 350 and for managing execution of the client service 305.

In an exemplary embodiment, one or more of the component programs A 361 and B 362 are written by a developer with a dependency 360. Generally, the proper execution of the client service 305 relies on fulfilling the dependency 360 with an appropriate functionality (e.g., the functionality 260 of the target service 205 of FIG. 2). In operation, the client service 305 may propagate an indication to fulfill the dependency 360 thereof. In response, the fabric controller 215 may inspect the dependency 360 and allocate a contract that exposes an abstraction of a functionality which satisfies the dependency 360. As discussed above, the contract that satisfies the dependency 360 may be previously implemented within the distributed computing environment 200. In addition, the implemented contract may be previously bound to a target service that carries out the functionality exposed by the contract.

Upon allocating the satisfying contract, the fabric controller 215 may bind this allocated and previously bound contract 335 to the client service 305. In embodiments, the process of binding the client service 305 may occur during the initial deployment of the component programs A 361 and B 362 of the client service 305 to initiate operation thereof. Generally, the deployment process includes automatically linking the component programs A 361 and B 362 to the interface 220 defined by the allocated bound contract 335. Where the bound contract 335 is configures the interface 220 with the constraints 295 derived from the set of properties 240. In one embodiment, the interface 220 is established within the distributed computing environment 200 upon implementation of the allocated bound contract 335. In addition, a description of the links may be written to a fabric controller 215. Alternatively, the links may be stored, at least temporarily, at any data store(s) that are accessible to the fabric controller 215 for future reference.

In an exemplary embodiment, the process of automatically linking the component programs A 361 and B 362 to the interface 220 may include identifying output endpoints 375 disposed on the component program B 362, where the component program B 362 exhibits the dependency 360. In general, the output endpoints 375, may represent a port that the component program B 362 uses to initiate requests for things from others. The process of automatically linking may continue with allocating communication channels 390 within the distributed computing environment 200 to operably couple the established interface 220 to the output endpoints 375. The communication channels 390 typically serve to convey the call 225 issued from the output endpoints 375 of the client service 305. Typically, the call 225 includes a request by the component program B 362 to fulfill the dependency 360 written thereto. In embodiments, the dependency 360 may include an external processing or retrieval of data that is not performed at the client service 305 but is accomplished by the functionality linked through the interface 220.

Upon completing the process of binding, the bound contract 335 is bound to both the client service 305 and a complimentary target service. In embodiments, the client service 305 can query the constraint 295 of the interface 220 to make a determination whether the interface 220 can accommodate the functional aspects specified by the service model 350 of the client service 305. If not, the client service 305 may be rebound by the fabric controller 215 to another contract that substitutes a bound interface and target service but preserves the functionality that fulfills the dependency 360. Rebinding may also occur when a bound target service falls offline.

For the purposes of associating the target service to the dependency 360 of the client service 305, there may by a variety of types of contracts employed. In one embodiment, self-bound contracts are utilized. In general, self-bound contracts are bound automatically by a plug-in mechanism operable by the fabric controller 215. Accordingly, the fabric controller 215 selects the target service, or pseudo-service, which will attend the calls 225 made via the interface 220.

In another embodiment, standard contracts are utilized. In general, standard contracts may be bound in two different ways. In one exemplary way, each target service is supplied a unique name. The fabric controller 215 may then check the validity of the association of the client service 305 and the target service, utilizing the unique name, by verifying that the bound target service indeed implements the bound contract 335. The network address (e.g., network address 265) is then obtained from the input endpoints of the target service. In another way, information about the output endpoint 375 of an external client service 305, which is not hosted by the data center 210, and/or the input endpoint of the target service (e.g., IP Address/DNS name:Port) is passed to the fabric controller 215. The IP:port specification is detected for the interface 220. Accordingly, the fabric controller 215 configures the output endpoints 375 of the component program B 362 linked to the interface 220. However, no verification that the named target service satisfies the bound contract 335 is performed.

In yet another exemplary embodiment, external contracts are utilized, typically when the client service 305 resides external to the data center 210. In general, the external contracts include a low-level abstraction, which allow the client service 305 to contact any public IP address within the bounds set out by the deployment of the client service 305. No binding is actually performed, and the client service 305 is assumed to provide the network address 265 of the target service to access the functionality thereof. As such, the network address 265 of the linked input endpoint is used to configure and route the communication channels 390.

As discussed above, the bound contract 335 may maintain the set of properties 240 associated with the established interface 220. In operation, the constraints 295 may be applied to the established interface 220 by parameterizing the established interface 220 with values derived from the associated set of properties 240. These applied constraints 295 may be published to the client service 305 for configuring the component programs A 361 and B 362. The process of configuring the client service 305 is illustrated by the reference numeral 388. In general, the process of configuring 388 component programs A 361 and B 362, along with the output endpoints 375, comprises extracting instructs from the constraints 295 applied to the interface 220. These instructions may be used for any number of configurations to aspects of the client service 305, as well as communications provided thereby. For instance, the instructions may be utilized for formatting the call 225 issued from output endpoints 375. By utilizing the instructions to configure the format of the call 225, among other things, the call 225 may be compatible with a protocol underlying the role instances of the target program that implement the desired functionality.

Once configured, the client service 305 may issue the call 225 when the dependency 360 is to be fulfilled. In embodiments, the call 225 may be issued from the output endpoints 375 of the component program B 362 that realizes the dependency 360. The call 225 is then routed over the allocated communication channels 390 of the distributed computing environment 200 to the established interface 220. As discussed more fully above, the established interface 220 may be parameterized to relay the issued call 225 to the target service or to filter out the issued call 225. This decision of the interface 220 may be based on the constraints 295 applied thereto in conjunction with an identity of the client service 305.

This exemplary distributed computing environment 220 is but one example of a suitable environment that may be implemented to carry out aspects of the present invention, and is not intended to suggest any limitation as to the scope of use or functionality of the invention. Neither should the illustrated exemplary system architecture of the distributed computing environment 220 be interpreted as having any dependency or requirement relating to any one or combination of the components 215, 220, 221, 225, 305, 335, 350, 360, 361, and 362 as illustrated. In some embodiments, one or more of the components 215, 220, 221, 224, 225, 305, 335, 350, 360, 361, and 362 may be implemented as stand-alone devices. In other embodiments, one or more of the components 215, 220, 221, 225, 305, 335, 350, 360, 361, and 362 may be integrated directly into the data center 210 or the fabric controller 215. It will be understood by those of ordinary skill in the art that the components 215, 220, 221, 225, 305, 335, 350, 360, 361, and 362 illustrated in FIG. 3 are exemplary in nature and in number and should not be construed as limiting.

Accordingly, any number of components may be employed to achieve the desired functionality within the scope of embodiments of the present invention. Although the various components of FIG. 3 are shown with lines for the sake of clarity, in reality, delineating various components is not so clear, and metaphorically, the lines would more accurately be grey or fuzzy. Further, although some components of FIG. 3 are depicted as single blocks, the depictions are exemplary in nature and in number and are not to be construed as limiting (e.g., although only one client service 305 is shown, many more may be communicatively coupled to the interface 220).

Figure 4:
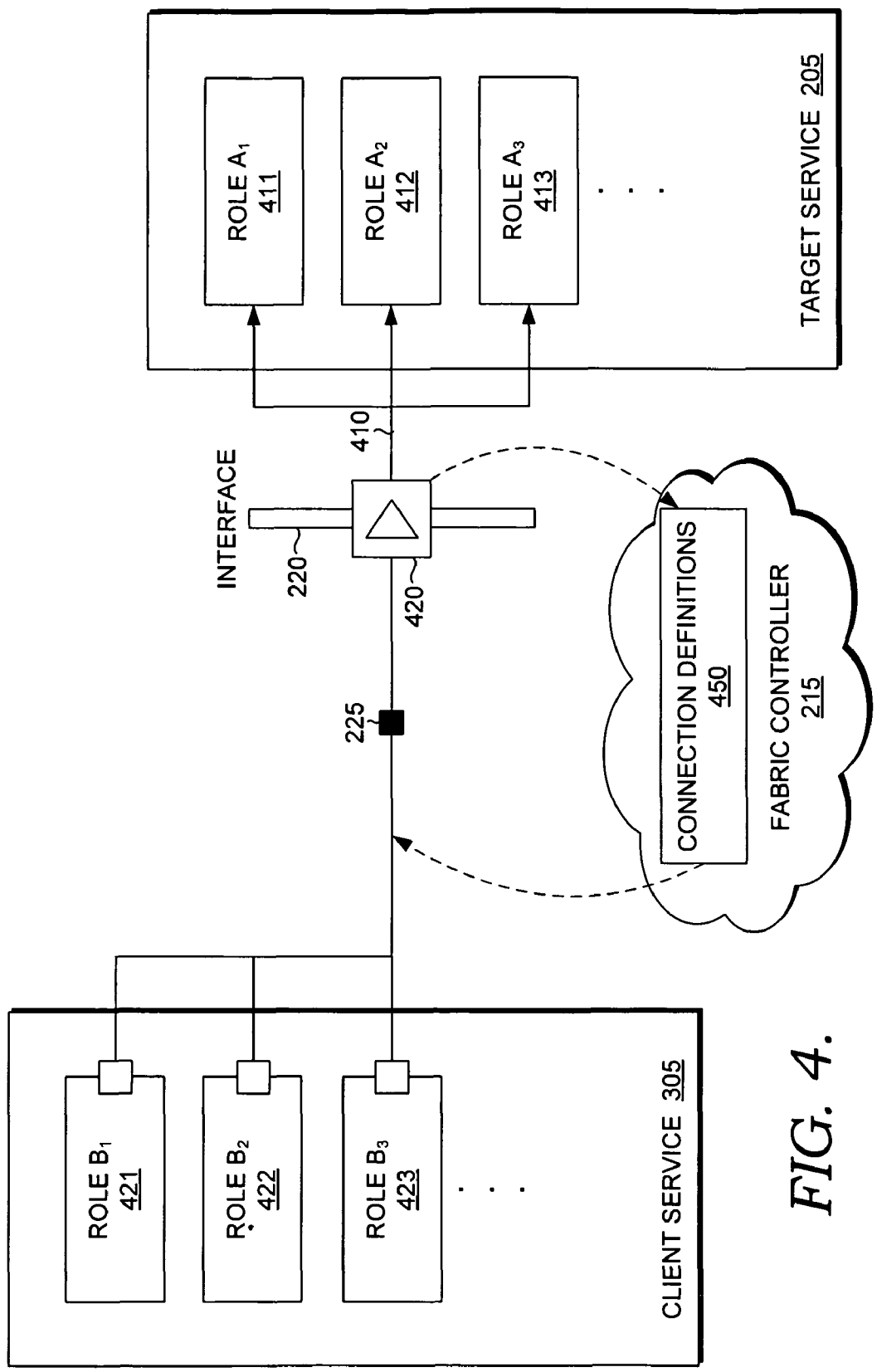
FIG. 4 is a graphical representation of an exemplary fabric controller for utilizing load-balancing (LB) channels to route communications between service applications, in accordance with an embodiment of the present invention.

Turning now to FIG. 4, a graphical representation of an exemplary fabric controller 215 for utilizing load-balancing (LB) channels 410 to route communications (e.g., calls 225 and replies) between service applications (e.g., client service 305 and target service 205) is shown, in accordance with an embodiment of the present invention. Initially, connection definitions 450 are provided that may be accessed by the fabric controller 215. These connection definitions 450 assist in instructing an LB mechanism 420 to route the communication to a selected one of a number of role instances 411, 412, and 413 of the target service 205. The role instance selected for receiving the call may be selected based on any number of factors including comparability with a role (e.g., roles 421, 422, and 423) of the client service 305 issuing the call 225, proximity to the role (e.g., roles 421, 422, and 423), availability, and the like.

Once selected, the call is transmitted to the selected role of the target service 205 via load-bearing (LB) channels 410 that link the established interface 220 to the input endpoints of the roles (e.g., roles 411, 412, and 413) of the target service 205. In one instance, transmitting may comprise receiving the call 225 from the client service 305 at the established interface 220, and invoking the LB mechanism 420 to distribute the call 225 to an available communication channel of the LB channels 410. As such, only one network address is provided to client service 305 for sending calls 225 thereto. The fabric controller 215 is responsible for implementing a load-balancing scheme, in light of the connection definitions 450, which ensures distribution of the calls 225 to the interface 220 are distributed among the roles (e.g., roles 411, 412, and 413) of the target service 205. In an exemplary embodiment, the network address is a virtual IP to the interface 220 and/or LB mechanism 420. The LB mechanism 420 may then translate the virtual IP into concrete IPs that are each associated with a different role.

Figure 5:
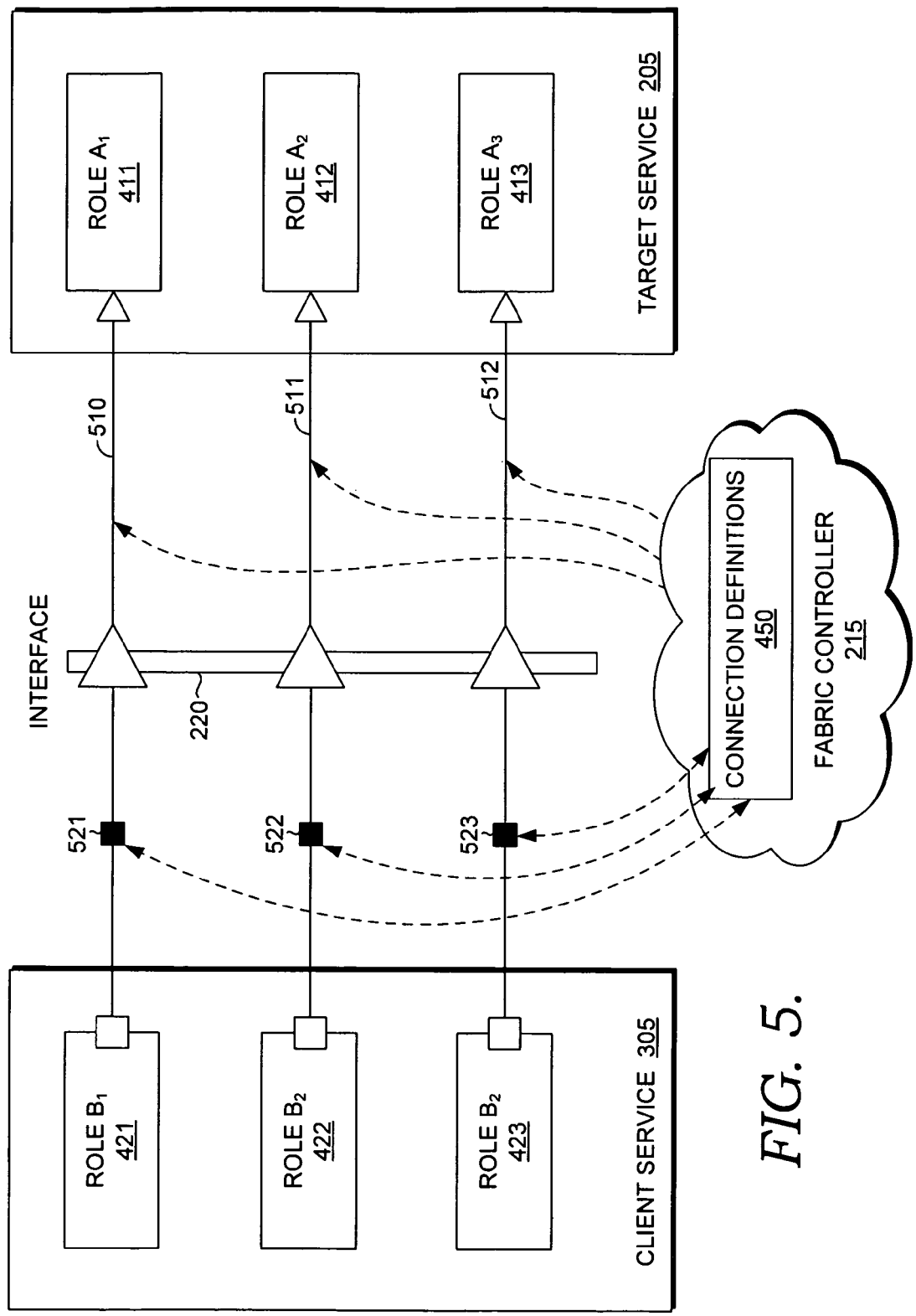
FIG. 5 is a graphical representation of an exemplary fabric controller for utilizing stateless-switch (SLS) channels to route communications between service applications, in accordance with an embodiment of the present invention.

With reference to FIG. 5, a graphical representation of an exemplary fabric controller for utilizing stateless-switch (SLS) channels (e.g., channels 510, 511, and 512) to route communications (e.g., calls 521, 522, and 523, and the replies in response thereto) between service applications (e.g., client service 305 and target service 205) in accordance with an embodiment of the present invention. In general, the allocated communication channels (see reference numeral 290 of FIG. 2) may comprise SLS channels 510, 511, and 512 that link the established interface 220 to the input endpoints of the roles (e.g., roles 411, 412, and 413) of the target service 205. These SLS channels 510, 511, and 512 may be stored by the connection definitions 450 and maintained by the fabric controller 215.

In operation, upon receiving the call (e.g., calls 521, 522, and 523), the fabric controller 215 identifies a network address associated with the call. The network address may be provided by the role (e.g., roles 421) of the client service 305 providing the call (e.g., call 521), or supplied by the connection definitions 450 based on an origin of the call. Based on the network address, the call 225 is routed over a communication channel (e.g., 510), of the SLS channels, designated to link the established interface 220 to the input endpoint of the appropriate role instance (e.g., role 411) of the target service 205. Accordingly, the fabric controller 215 ensures that there are as many reachable externally addressable input endpoints as component programs, or roles, of the client service linked to the interface 220. In this way, each outpoint endpoint corresponds to a single input endpoint, thereby designating a single SLS channel and single network address for routing the call.

With reference to FIG. 6, a flow diagram is illustrated that shows an overall method 600 for automatically implementing a contract and binding the implemented contract to the target service, in accordance with an embodiment of the present invention. Moreover, although the terms "step" and/or "block" may be used herein to connote different elements of methods employed, the terms should not be interpreted as implying any particular order among or between various steps herein disclosed unless and except when the order of individual steps is explicitly described. Initially, as depicted at block 605, a contract that defines an aggregation of interfaces is identified. Additionally, the contract maintains a set of properties for installing each of the interfaces. As depicted at block 610, the identified contract is implemented to establish an interface of the aggregation of interfaces within the distributed computing environment. Typically, the implemented contract introduces a vehicle for a client service to reach a portion of the target service. As depicted at block 615, the implemented contract is bound to the target service by parameterizing the established interface with values derived from the set of properties associated with the established interface. In embodiments, the process of parameterizing includes automatically linking the established interface and one or more role instances thereof (see block 620), and mapping the links via a fabric controller responsible for managing the execution of the target service (see block 625). By way of clarification, the role instances embody replications of at least one role that represents a type of component program that, upon execution, confers functionality to the target service.

Turning now to FIG. 7, a flow diagram is illustrated that shows an overall method 700 for automatically allocating the implemented contract based on dependencies of the client service and binding the allocated contract thereto, in accordance with an embodiment of the present invention. Initially, as depicted at block 705, an indication to fulfill a dependency is received from the client service. As discussed above, the client service comprises one or more component programs. As depicted at block 710, a contract is allocated that exposes an abstraction of a functionality which satisfies the dependency of the component programs of the client service. Typically, the contract is implemented within the distributed computing environment and is bound to a target service that carries out the functionality. As indicated at block 715, the client service is deployed to initiate operation thereof. In embodiments, deploying involves automatically linking the component programs to an interface defined by the allocated bound contract (see block 720), and writing a description of the links to a fabric controller responsible for managing the execution of the target service (see block 725). In general, the interface is established within the distributed computing environment upon implementation of the allocated bound contract.

One of ordinary skill in the art will realize that any number of steps may be employed to achieve the desired functionality within the scope of embodiments illustrated in FIGS. 6 and 7. Further, although the various steps of FIGS. 6 and 7 are shown with lines for the sake of clarity, in reality, delineating various components is not so clear, and metaphorically, the lines would more accurately be grey or fuzzy. Further yet, although some steps of FIGS. 6 and 7 are depicted as single processes, the depictions are exemplary in nature and in number and are not to be construed as limiting.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable storage devices having computer-executable instructions embodied thereon that, when executed, perform a method for binding an implemented contract to a target service within a distributed computing environment, the method comprising:

receiving an indication to fulfill functional aspects upon which a client service depends;

identifying a contract that satisfies the functional-aspects dependency of the client application, wherein the identified contract defines one or more interfaces, and maintains a set of properties that specify constraints for governing, in part, operation of the one or more interfaces;

implementing the identified contract to establish and tailor the one or more interfaces, wherein implementing the contract comprises:
 (a) establishing the one or more interfaces within the distributed computing environment; and
 (b) configuring the established one or more interfaces by administering values derived from the set of properties thereto, thereby enabling the client service to reach a portion of the target service via the one or more interfaces, wherein the one or more interfaces, upon configuration, enforce the constraints specified by the contract when managing communications from the client service to the target service, and wherein the constraints relate to at least one of restricting access to the target service, authenticating the client service, opening or closing connections to the target service, filtering a flow of traffic to the target service, or defining which ports are used for receiving a call;

binding the implemented contract to the target service, wherein the process of binding comprises:
 (a) automatically linking the one or more established and configured interfaces to one or more role instances, wherein the one or more role instances embody replications of at least one role that represents a type of component program that, upon execution, confers functionality to the target service; and
 (b) mapping the links via a fabric controller responsible for managing the execution of the target service.

2. The computer-readable storage devices of claim 1, wherein the method comprises providing a service model that maintains a specification for deploying the one or more role instances of the target service onto nodes within the distributed computing environment, wherein the deployment specification constructs interconnections between input endpoints and output endpoints disposed on the one or more role instances.

3. The computer-readable storage devices of claim 2, wherein the one or more established interfaces, upon binding the implemented contract, are linked to the input endpoints of the one or more role instances.

4. The computer-readable storage devices of claim 3, wherein linking the established interface and one or more role instances comprises allocating communication channels traversing the distributed computing environment to operably couple the one or more established interfaces to the linked input endpoints.

5. The computer-readable storage devices of claim 4, wherein the allocated communication channels comprise load-bearing (LB) channels that link the one or more established interfaces to the input endpoints of the one or more roles, and wherein the method further comprises:
  receiving a call from the client service at the one or more established interfaces; and
  invoking an LB mechanism to distribute the call to an available communication channel of the LB channels.

6. The computer-readable storage devices of claim 4, wherein the method further comprises identifying network addresses for locating the input endpoints of the one or more role instances linked to the one or more established interfaces.

7. The computer-readable storage devices of claim 6, wherein the method further comprises making the network addresses visible to the client service, and wherein component programs of the client service are configured to route a call to the one or more role instances utilizing the network addresses.

8. The computer-readable storage devices of claim 7, wherein the allocated communication channels comprise stateless switch (SLS) channels that link the one or more established interfaces to the input endpoints of the one or more roles, wherein the method further comprises:
  receiving the call and the selected network address from the client service at the one or more established interfaces; and
  routing the call over a communication channel, of the SLS channels, designated to link the one or more established interfaces to the input endpoint.

9. The computer-readable storage devices of claim 1, wherein the process of binding further comprises automatically reconfiguring the one or more role instances based on the specified constraints that are enforced by the one or more established interfaces.

10. A computerized method for binding a bound contract to a client service within a distributed computing environment, the method comprising:
  receiving from the client service an indication to fulfill a dependency thereof, wherein the client service comprises one or more component programs;
  allocating a contract that exposes an abstraction of a functionality which satisfies the dependency of the one or more component programs of the client service, wherein the contract is implemented within the distributed computing environment and is bound to a target service that carries out the functionality;
  deploying the client service to initiate operation thereof, wherein deploying comprises:
    (a) automatically linking the one or more component programs to an interface defined by the allocated bound contract, wherein the interface is established within the distributed computing environment upon implementation of the allocated bound contract, and wherein the bound contract maintains a set of properties associated with the interface;
    (b) writing a description of the links to a fabric controller responsible for managing the execution of the target service;
    (c) applying constraints to the established interface by administering values thereto that are derived from the set of properties, wherein the constraints govern, in part, operation of the established interface; and
    (d) publishing the applied constraints to the client service for configuring the one or more component programs.

11. The computerized method of claim 10, wherein automatically linking the one or more component programs to an interface comprises:
  identifying output endpoints disposed on the one or more component programs, respectively; and
  allocating communication channels within the distributed computing environment to operably couple the established interface to the output endpoints.

12. The computerized method of claim 11, wherein the target service comprises one or more instances of at least one role, and wherein the at least one role represents a particular class of components that operate in conjunction with other roles of the target service to realize the functionality that satisfies the dependency of the client service.

13. The computerized method of claim 12, wherein configuring the one or more component programs comprises extracting instructions from the applied constraints for formatting a call issued from output endpoints of the one or more component programs such that the call is compatible with a protocol underlying the one or more role instances.

14. The computerized method of claim 13, wherein the call issued from the output endpoints of the one or more component programs is routed over the allocated communication channels of the distributed computing environment to the established interface.

15. The computerized method of claim 13, wherein the established interface is configured, upon applying the constraints thereto, to relay the issued call to the one or more role instances or to filter out the issued call based on the applied constraints in conjunction with an identity of the client service.

16. The computerized method of claim 15, wherein the identity of the client service is recorded by the fabric controller, and wherein, upon relaying the issued call to the one or more role instances, a claim appended to the issued call is inspected to ascertain whether to honor requests of the call.

17. The computerized method of claim 16, wherein appending the claim to the issued call comprises:
  accessing the identity of the client service to verify that the one or more component programs issued the call; and
  integrating the determined identity and other characteristics of the client service into the claim, thereby ensuring a particular level of security at the target service.

18. A computer system for performing a method that automatically links a client service to a target service by way of implementing and binding a contract made available by a distributed computing environment, the computer system comprising a computer storage device having a plurality of computer software components embodied thereon, the computer software components comprising:
  a client service that submits an indication to fulfill a dependency thereof, wherein the client service comprises one or more component programs;

a target service that includes one or more role instances, wherein the one or more role instances embody replications of at least one role that represents a type of component program that, upon execution, confers functionality to the target service;

a contract that exposes an abstraction of the functionality of the target service, which satisfies the dependency of the one or more component programs of the client service, that defines at least one interface and specifies constraints enforced by the at least one interface; and a fabric controller for binding the contract to the target service and to the client service, wherein the process of binding comprises:

(a) establishing the at least one interface on the distributed computing platform by implementing the contract; and (b) configuring the at least one established interface by administering values derived from the contract thereto, thereby enabling the client service to reach a portion of the target service via the at least one interface, wherein the at least one interface, upon configuration, enforces the constraints specified by the contract when managing communications between the client service and the target service;

the fabric controller further configured for automatically linking the one or more program components of the client service to the one or more role instances of the target service via the established interface.

* * * * *